T. V. BOYLE.
NUT LOCK.
APPLICATION FILED APR. 9, 1908.

898,432.

Patented Sept. 15, 1908.

Thomas V. Boyle,
Inventor

Witnesses
M. A. Schmidt
Geo. E. Tew

By M. W. B. Thornto,
Attorneys.

UNITED STATES PATENT OFFICE.

THOMAS V. BOYLE, OF CLEVELAND, OHIO.

NUT-LOCK.

No. 898,432.	Specification of Letters Patent.	Patented Sept. 15, 1908.

Application filed April 9, 1908. Serial No. 426,081.

*To all whom it may concern:*

Be it known that I, THOMAS V. BOYLE, citizen of the United States, residing at Cleveland, in the county of Cuyahoga and State of Ohio, have invented certain new and useful Improvements in Nut-Locks, of which the following is a specification.

This invention relates to nut locks and has for its object to provide an improved device of the kind having several novel features of construction and operation, as will more fully appear from the following description and the accompanying drawings.

Figure 1:
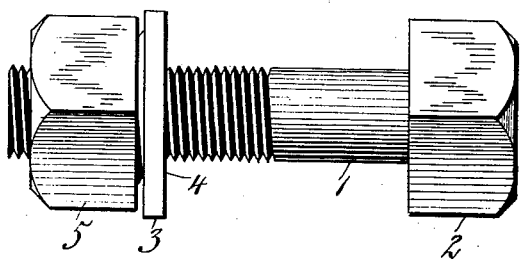
Figure 2:
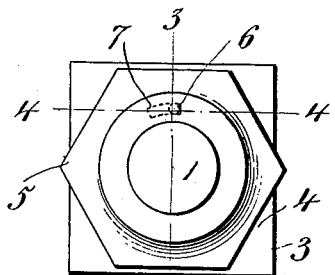
Figure 3:
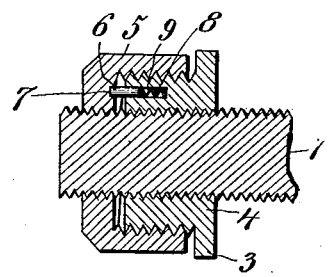
Figure 4:
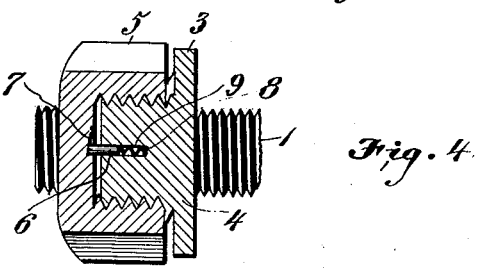

In the drawings, Figure 1 is a side view of a bolt provided with the invention. Fig. 2 is an end view. Fig. 3 is a section on the line 3—3 of Fig. 2. Fig. 4 is a section on the line 4—4 of Fig. 2.

Referring specifically to the drawings, 1 is a bolt with a head 2. The nut lock comprises a nut 4 having internal and external threads of different pitch the former of which screw on the threads of the bolt. At the base the nut has an outwardly extending flange 3. The external threads of the nut receive a hollow cap 5 having internal threads, and the base or end of the cap has on the inside a segmental notch 7 inclined at one end and with a square shoulder at the other. The nut 4 has in the top thereof a longitudinal hole 9 arranged to register with the notch 7 and this hole contains a pin 6 pressed behind by a spring 8.

The internal and external threads on the nut 4 run in the same direction, and the lock is dependent upon the bind on the threads of the bolt produced by relative movement of the inner nut 4 and the outer cap 5. When the latter is screwed on the former the pin 6 snaps behind the shoulder of the notch 7 and locks them together, although the cap can still be screwed on somewhat farther, its base being spaced from the flange 3. In this condition the nut and its cap are screwed on the bolt and against the work, the wrench being applied to the flange 3 of the nut which extends slightly beyond the side of the cap 5. When the nut is tight the wrench is applied to the cap 5 and this is turned forward, that is, in the same direction the nut was turned, and this brings the threads in the parts 4 and 5 out of pitch causing a bind on the threads of the bolt. The nut can be removed by releasing the cap 5 by reverse movement thereof, to bring the threads in pitch again, after which both parts can be turned off the bolt. The threads come into pitch when the pin 6 reaches the shoulder of the notch 7, and then both parts will turn off together.

I claim:

A nut lock comprising a bolt, a nut thereon having internal and external threads of different pitch, a cap screwed on the bolt behind the nut and also having threads engaging with the external threads of the nut, the cap having an internal segmental notch with a shoulder at one end thereof and inclined at the other, and a spring catch projecting from the nut into said notch and engaging with the shoulder to prevent removal of the cap from the nut.

In testimony whereof I affix my signature, in presence of two witnesses.

THOMAS V. BOYLE.

Witnesses:
 JOHN BOYLE,
 JOHN A. BOMMHARDT.